US012546100B2

(12) United States Patent
Kohler et al.

(10) Patent No.: US 12,546,100 B2
(45) Date of Patent: *Feb. 10, 2026

(54) COMPOSITE FAUCET BODY AND INTERNAL WATERWAY

(71) Applicant: Kohler Co., Kohler, WI (US)

(72) Inventors: Jeffrey A. Kohler, Richfield, WI (US); David J. Macon, Sheboygan, WI (US); Mark W. Schibur, Sheboygan, WI (US); Thomas Manoni, Port Washington, WI (US); Vindhya K. Tiwari, Sheboygan, WI (US); Jeffrey A. Schumacher, Port Washington, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,065

(22) Filed: May 7, 2024

(65) Prior Publication Data

US 2024/0287774 A1 Aug. 29, 2024

Related U.S. Application Data

(63) Continuation of application No. 17/872,873, filed on Jul. 25, 2022, now Pat. No. 11,982,073, which is a
(Continued)

(51) Int. Cl.
*E03C 1/04* (2006.01)
*B29C 39/10* (2006.01)
(Continued)

(52) U.S. Cl.
CPC ............ *E03C 1/0404* (2013.01); *E03C 1/084* (2013.01); *B29C 39/10* (2013.01); *B29L 2031/769* (2013.01); *Y10T 137/9464* (2015.04)

(58) Field of Classification Search
CPC ....... E03C 1/0404; E03C 1/084; B29C 33/56; B29C 39/10; B29C 45/14622
(Continued)

(56) References Cited

U.S. PATENT DOCUMENTS

| 1,058,270 A | 4/1913 | Stephens |
| 1,412,436 A | 4/1922 | Wilkin |

(Continued)

FOREIGN PATENT DOCUMENTS

| AU | 53485/73 A | 9/1974 |
| BR | 7301989 | 5/1994 |

(Continued)

OTHER PUBLICATIONS

Chinese First Office Action on CN 201810496110X DTD Nov. 22, 2019.
Chinese Second Office Action on CN 201710277300.8 dated May 13, 2019.
Chinese Third Office Action on CN 201710277300.8 dated Aug. 5, 2019.
(Continued)

*Primary Examiner* — Daphne M Barry
(74) *Attorney, Agent, or Firm* — Foley & Lardner LLP

(57) ABSTRACT

A faucet includes an internal waterway. The internal waterway is at least partially formed of a first material defined by a maximum temperature. The internal waterway includes a valve seat configured to receive water and a conduit coupled to the valve seat and configured to receive the water from the valve seat. The faucet further includes a body formed of a second material having a processing temperature less than the maximum temperature of the first material forming the internal waterway, wherein the body is cast around the internal waterway.

20 Claims, 8 Drawing Sheets

Related U.S. Application Data continuation of application No. 16/905,677, filed on Jun. 18, 2020, now Pat. No. 11,408,158, which is a continuation of application No. 15/495,154, filed on Apr. 24, 2017, now Pat. No. 10,711,442.

(60) Provisional application No. 62/327,536, filed on Apr. 26, 2016.

(51) Int. Cl.
  *B29L 31/00* (2006.01)
  *E03C 1/084* (2006.01)

(58) Field of Classification Search
  USPC .......................................................... 137/801
  See application file for complete search history.

(56) References Cited

U.S. PATENT DOCUMENTS

| | | |
|---|---|---|
| 2,087,112 A | 7/1937 | Nishinaka |
| 2,200,091 A | 5/1940 | Kovach |
| 2,219,471 A | 10/1940 | Davis |
| 2,287,371 A | 6/1942 | Blakesley et al. |
| 2,367,809 A | 1/1945 | Stein |
| 2,387,013 A | 10/1945 | Fuller |
| 2,447,738 A | 8/1948 | Conner |
| 2,593,087 A | 4/1952 | Baggette |
| 2,717,953 A | 9/1955 | Brandi |
| 2,795,844 A | 6/1957 | Liszak |
| 2,972,034 A | 2/1961 | Easley |
| 3,045,096 A | 7/1962 | Cyril |
| 3,073,937 A | 1/1963 | Easley |
| 3,212,106 A | 10/1965 | Austin |
| 3,271,845 A | 9/1966 | Stubbe |
| 3,493,721 A | 2/1970 | Kamitani et al. |
| 3,587,118 A | 6/1971 | Compton |
| 3,591,868 A | 7/1971 | Owens |
| 3,712,584 A | 1/1973 | Wise et al. |
| 3,816,234 A | 6/1974 | Winfield |
| 3,843,977 A | 10/1974 | Garnett |
| 3,961,770 A | 6/1976 | Wrasman |
| 3,982,288 A | 9/1976 | Borne |
| 4,038,358 A | 7/1977 | Wrasman |
| 4,086,318 A | 4/1978 | Garasi et al. |
| 4,145,772 A | 3/1979 | Whitney et al. |
| 4,160,295 A | 7/1979 | Putyra |
| 4,176,689 A | 12/1979 | Wrasman |
| 4,237,934 A | 12/1980 | Gregory et al. |
| 4,422,190 A | 12/1983 | Huang |
| 4,446,584 A | 5/1984 | Suzuki et al. |
| 4,458,839 A | 7/1984 | MacDonald |
| 4,552,171 A | 11/1985 | Farrell et al. |
| 4,558,473 A | 12/1985 | Morikawa et al. |
| 4,697,656 A | 10/1987 | de Canecaude |
| 4,736,471 A | 4/1988 | Johnson |
| 4,841,583 A | 6/1989 | Ohara et al. |
| 4,884,596 A | 12/1989 | Byers et al. |
| 4,983,443 A | 1/1991 | Balmer et al. |
| 5,006,207 A | 4/1991 | Peterman et al. |
| 5,022,946 A | 6/1991 | Stewart |
| 5,033,508 A | 7/1991 | Laverty, Jr. |
| 5,084,917 A | 2/1992 | Matsubara et al. |
| 5,095,555 A | 3/1992 | Torii et al. |
| 5,111,539 A | 5/1992 | Hiruta et al. |
| 5,129,804 A | 7/1992 | Perantoni et al. |
| 5,170,514 A | 12/1992 | Weigert |
| 5,170,944 A | 12/1992 | Shirai |
| 5,224,509 A | 7/1993 | Tanaka et al. |
| 5,231,706 A | 8/1993 | Kendall |
| 5,243,717 A | 9/1993 | Yasuo |
| 5,276,595 A | 1/1994 | Patrie |
| 5,307,524 A | 5/1994 | Veal |
| D349,760 S | 8/1994 | Schlumpf |
| 5,398,352 A | 3/1995 | Kordelin |
| 5,502,845 A | 4/1996 | Hayashi et al. |
| 5,504,950 A | 4/1996 | Natalizia et al. |
| 5,566,702 A | 10/1996 | Philipp |
| 5,579,808 A | 12/1996 | Mikol et al. |
| 5,579,823 A | 12/1996 | Mikol et al. |
| 5,611,089 A | 3/1997 | Cretors |
| 5,642,531 A | 7/1997 | Holtom et al. |
| 5,655,749 A | 8/1997 | Mauerhofer |
| 5,664,867 A | 9/1997 | Martin et al. |
| 5,666,672 A | 9/1997 | Birsel et al. |
| 5,694,653 A | 12/1997 | Harald |
| 5,829,468 A | 11/1998 | Watanabe et al. |
| 5,855,356 A | 1/1999 | Fait |
| 5,868,311 A | 2/1999 | Cretu-Petra |
| 5,896,591 A | 4/1999 | Horan et al. |
| 5,909,968 A | 6/1999 | Olin et al. |
| 5,918,855 A | 7/1999 | Hamanaka et al. |
| 5,926,099 A | 7/1999 | Unum |
| 5,940,895 A | 8/1999 | Wilson et al. |
| 5,961,095 A | 10/1999 | Schrott |
| 5,978,975 A | 11/1999 | Asskaryar |
| 6,019,130 A | 2/2000 | Rump |
| 6,082,407 A | 7/2000 | Paterson et al. |
| 6,154,892 A | 12/2000 | Hogue |
| 6,203,164 B1 | 3/2001 | Tufekci et al. |
| 6,212,700 B1 | 4/2001 | Giesler et al. |
| 6,273,394 B1 | 8/2001 | Vincent et al. |
| 6,294,786 B1 | 9/2001 | Marcichow et al. |
| 6,307,180 B1 | 10/2001 | Arx et al. |
| 6,321,785 B1 | 11/2001 | Bergmann |
| 6,340,032 B1 | 1/2002 | Zosimadis |
| 6,380,499 B1 | 4/2002 | Edwards |
| 6,386,226 B1 | 5/2002 | Lopp et al. |
| 6,438,770 B1 | 8/2002 | Hed et al. |
| 6,691,340 B2 | 2/2004 | Honda et al. |
| 6,698,036 B2 | 3/2004 | Armbruster et al. |
| 6,775,858 B1 | 8/2004 | Miller |
| 6,775,863 B2 | 8/2004 | Hutchings |
| 6,817,379 B2 | 11/2004 | Perla |
| 7,014,166 B1 | 3/2006 | Wang |
| 7,104,519 B2 | 9/2006 | O'Maley et al. |
| 7,107,631 B2 | 9/2006 | Ang et al. |
| 7,161,118 B1 | 1/2007 | Modeste et al. |
| 7,293,297 B2 | 11/2007 | Hayashi et al. |
| 7,325,781 B2 | 2/2008 | Parsons et al. |
| 7,353,577 B2 | 4/2008 | Davies et al. |
| 7,380,292 B1 | 6/2008 | Harris |
| 7,404,413 B2 | 7/2008 | Chang |
| 7,430,988 B2 | 10/2008 | Perlsweig et al. |
| 7,434,960 B2 | 10/2008 | Stuhlmacher et al. |
| 7,472,433 B2 | 1/2009 | Rodenbeck et al. |
| 7,543,339 B1 | 6/2009 | Harris |
| 7,614,096 B2 | 11/2009 | Vincent |
| 7,717,133 B2 | 5/2010 | Pinette et al. |
| 7,731,154 B2 | 6/2010 | Parsons et al. |
| 7,748,409 B2 | 7/2010 | Pinette et al. |
| 7,760,332 B2 | 7/2010 | Yamaguchi |
| 7,766,043 B2 | 8/2010 | Thomas et al. |
| 7,797,767 B2 | 9/2010 | Benkhardt et al. |
| 7,806,141 B2 | 10/2010 | Marty et al. |
| 7,819,137 B2 | 10/2010 | Nelson et al. |
| 7,819,541 B2 | 10/2010 | Kunkel |
| 7,927,534 B1 | 4/2011 | Seman et al. |
| 7,979,928 B2 | 7/2011 | Allen et al. |
| 8,104,113 B2 | 1/2012 | Rodenbeck et al. |
| 8,117,683 B2 | 2/2012 | Yamamoto et al. |
| 8,191,182 B2 | 6/2012 | Mauduit |
| 8,247,476 B2 | 8/2012 | Hajek et al. |
| 8,337,738 B1 | 12/2012 | Seman et al. |
| 8,355,822 B2 | 1/2013 | Jonte et al. |
| 8,365,770 B2 | 2/2013 | Thomas et al. |
| 8,373,096 B2 | 2/2013 | Tsai et al. |
| 8,376,313 B2 | 2/2013 | Burke et al. |
| 8,407,821 B2 | 4/2013 | Chan |
| 8,418,272 B2 | 4/2013 | Nishimura et al. |
| 8,469,056 B2 | 6/2013 | Marty et al. |
| 8,510,872 B2 | 8/2013 | Muhlhausen et al. |
| 8,516,628 B2 | 8/2013 | Conroy |
| 8,528,123 B2 | 9/2013 | Hashem et al. |
| 8,536,254 B2 | 9/2013 | Hajek et al. |

(56) References Cited

U.S. PATENT DOCUMENTS

| | | |
|---|---|---|
| 8,555,427 B2 | 10/2013 | Stauber et al. |
| 8,679,622 B2 | 3/2014 | Delong et al. |
| 8,739,826 B2 | 6/2014 | Thomas et al. |
| 8,827,239 B2 | 9/2014 | Chen |
| 8,881,317 B2 | 11/2014 | Tokunaga |
| 8,910,320 B2 | 12/2014 | Stauber et al. |
| 8,944,105 B2 | 2/2015 | Rodenbeck et al. |
| 8,978,172 B2 | 3/2015 | Plate et al. |
| 8,984,679 B2 | 3/2015 | Bayley et al. |
| 8,985,146 B2 | 3/2015 | Thomas et al. |
| 8,991,425 B2 | 3/2015 | Devries et al. |
| 9,010,377 B1 | 4/2015 | O'Brien et al. |
| 9,021,620 B1 | 5/2015 | Walker |
| 9,096,002 B2 | 8/2015 | Seman et al. |
| 9,169,628 B2 | 10/2015 | Komorita |
| 9,194,110 B2 | 11/2015 | Frick et al. |
| 9,279,239 B2 | 3/2016 | Feng |
| 9,290,922 B2 | 3/2016 | Bernabei et al. |
| 9,321,897 B2 | 4/2016 | Kabeya et al. |
| 9,341,278 B2 | 5/2016 | Esche |
| 9,347,207 B2 | 5/2016 | Chen |
| 9,445,699 B2 | 9/2016 | Mangrum, Jr. |
| 9,562,549 B2 | 2/2017 | Mcclure |
| 9,573,191 B2 | 2/2017 | Jagtap et al. |
| 9,586,352 B2 * | 3/2017 | Hua .................. B22D 19/0072 |
| 9,596,961 B2 | 3/2017 | Stokely et al. |
| 9,632,537 B2 | 4/2017 | Memering et al. |
| 2001/0037520 A1 | 11/2001 | Farzanehfar |
| 2002/0021086 A1 | 2/2002 | Czak |
| 2003/0041374 A1 | 3/2003 | Franke |
| 2003/0062088 A1 | 4/2003 | Perla |
| 2004/0032749 A1 | 2/2004 | Schindler et al. |
| 2004/0226082 A1 | 11/2004 | Squicciarini |
| 2004/0228127 A1 | 11/2004 | Squicciarini |
| 2006/0214016 A1 | 9/2006 | Erdely et al. |
| 2006/0258915 A1 | 11/2006 | Ueda et al. |
| 2007/0151011 A1 | 7/2007 | Brown |
| 2007/0271695 A1 | 11/2007 | Thomas et al. |
| 2008/0010734 A1 | 1/2008 | Chang |
| 2008/0109956 A1 | 5/2008 | Bayley et al. |
| 2008/0178942 A1 | 7/2008 | Pinette et al. |
| 2008/0178950 A1 | 7/2008 | Marty et al. |
| 2008/0178954 A1 | 7/2008 | Pinette et al. |
| 2008/0271231 A1 | 11/2008 | Stauber et al. |
| 2009/0020177 A1 | 1/2009 | Nelson et al. |
| 2009/0038686 A1 | 2/2009 | Lin |
| 2009/0041962 A1 | 2/2009 | Mertens et al. |
| 2009/0266433 A1 | 10/2009 | Liang |
| 2010/0127607 A1 | 5/2010 | Harris |
| 2010/0313979 A1 | 12/2010 | Thomas et al. |
| 2011/0016625 A1 | 1/2011 | Marty et al. |
| 2011/0191950 A1 | 8/2011 | Liu |
| 2011/0259456 A1 | 10/2011 | Pinette et al. |
| 2012/0000012 A1 | 1/2012 | Cheung |
| 2012/0023651 A1 | 2/2012 | Taylor et al. |
| 2012/0186681 A1 | 7/2012 | Sun et al. |
| 2012/0186768 A1 | 7/2012 | Sun et al. |
| 2012/0266371 A1 | 10/2012 | Zhang |
| 2012/0273703 A1 | 11/2012 | Hsu et al. |
| 2013/0007953 A1 | 1/2013 | Niu et al. |
| 2013/0075952 A1 | 3/2013 | Seman et al. |
| 2013/0146164 A1 | 6/2013 | Thomas et al. |
| 2013/0174929 A1 | 7/2013 | Song |
| 2013/0198947 A1 | 8/2013 | Yeung |
| 2013/0263936 A1 | 10/2013 | DeVries et al. |
| 2013/0299026 A1 | 11/2013 | Gossing et al. |
| 2013/0299027 A1 | 11/2013 | Gossing et al. |
| 2013/0299028 A1 | 11/2013 | Gossing et al. |
| 2014/0102634 A1 | 4/2014 | Harder |
| 2014/0239543 A1 | 8/2014 | Thomas et al. |
| 2014/0338777 A1 | 11/2014 | Jagtap et al. |
| 2015/0013056 A1 | 1/2015 | Lee |
| 2015/0013784 A1 | 1/2015 | Roje et al. |
| 2015/0085429 A1 | 3/2015 | Memering et al. |
| 2015/0192214 A1 | 7/2015 | Thomas et al. |
| 2016/0145548 A1 | 5/2016 | Van Tol et al. |
| 2016/0235263 A1 | 8/2016 | Du et al. |
| 2016/0263796 A1 | 9/2016 | Hua |
| 2017/0043875 A1 | 2/2017 | Vervaet et al. |

FOREIGN PATENT DOCUMENTS

| | | |
|---|---|---|
| BR | 0712172 | 1/2012 |
| BR | 102013011740 A2 | 6/2015 |
| BR | 102013011741 A2 | 6/2015 |
| BR | 102013011755 B2 | 6/2015 |
| CA | 2652806 | 12/2007 |
| CA | 2786694 | 12/2007 |
| CA | 2725410 | 10/2009 |
| CA | 2681259 | 4/2010 |
| CA | 2769974 | 9/2012 |
| CA | 2798060 | 6/2013 |
| CA | 2845213 | 9/2014 |
| CN | 101029499 | 9/2007 |
| CN | 101454602 A | 6/2009 |
| CN | 1015148428.4 | 9/2009 |
| CN | 201363485 Y | 12/2009 |
| CN | 201369485 Y | 12/2009 |
| CN | 102481630 A | 5/2012 |
| CN | 102481631 A | 5/2012 |
| CN | 102518854 A | 6/2012 |
| CN | 103291954 A | 9/2013 |
| CN | 103362198 | 10/2013 |
| CN | 103386467 A | 11/2013 |
| CN | 103386468 A | 11/2013 |
| CN | 103388697 A | 11/2013 |
| CN | 203267335 | 11/2013 |
| CN | 103949855 A | 7/2014 |
| CN | 104048072 A | 9/2014 |
| DE | 10 2005 056 630 A1 | 1/1900 |
| DE | 10 2010 037 800 A1 | 1/1900 |
| DE | 19730330 A1 | 1/1900 |
| DE | 20206136 U1 | 1/1900 |
| DE | 20206139 U1 | 1/1900 |
| DE | 23 13 696 | 9/1973 |
| EP | 0 239 877 A2 | 10/1987 |
| EP | 0 378 406 A2 | 7/1990 |
| EP | 0 679 359 A1 | 11/1995 |
| EP | 0 950 843 A2 | 10/1999 |
| EP | 0 961 067 B1 | 12/1999 |
| EP | 1 464 766 A2 | 10/2004 |
| EP | 1 961 876 A2 | 8/2008 |
| EP | 2 024 672 A1 | 2/2009 |
| EP | 2 033 721 A1 | 3/2009 |
| EP | 2 034 097 A2 | 3/2009 |
| EP | 2 088 251 A2 | 8/2009 |
| EP | 2 090 701 A1 | 8/2009 |
| EP | 2 189 583 | 5/2010 |
| EP | 2 210 988 A2 | 7/2010 |
| EP | 2 281 957 A2 | 2/2011 |
| EP | 2 445 668 A2 | 5/2012 |
| EP | 2 445 669 A2 | 5/2012 |
| EP | 2 537 894 A1 | 12/2012 |
| EP | 2 572 616 | 3/2013 |
| EP | 2 662 163 A2 | 11/2013 |
| EP | 2 662 164 A2 | 11/2013 |
| EP | 2 662 165 A2 | 11/2013 |
| EP | 2 882 058 A1 | 6/2015 |
| EP | 2 934 265 A1 | 10/2015 |
| EP | 3 037 025 A1 | 6/2016 |
| EP | 3 075 529 A1 | 10/2016 |
| EP | 3 406 812 | 11/2018 |
| ES | 2524875 | 12/2014 |
| ES | 2536758 | 5/2015 |
| FR | 2176953 B2 | 11/1973 |
| GB | 0 862 926 | 3/1961 |
| GB | 2 069 830 A | 9/1981 |
| IN | 01688MU2013 | 3/2015 |
| IN | 01689MU2013 | 3/2015 |
| IN | 01690MU2013 | 3/2015 |
| IT | 979901 | 9/1974 |
| JP | S496762 A | 1/1974 |
| JP | 1037279 | 2/1998 |
| JP | 2001-327437 A | 11/2001 |

(56) References Cited

FOREIGN PATENT DOCUMENTS

| | | |
|---|---|---|
| JP | 2004-242802 A | 9/2004 |
| JP | 2012-531313 A | 12/2012 |
| JP | 2012-531548 A | 12/2012 |
| JP | 2016-147978 A | 8/2016 |
| MX | 2008014785 | 12/2008 |
| MX | 2012002986 | 10/2012 |
| NO | 130370 | 8/1974 |
| RU | 2008151759 | 7/2010 |
| WO | WO-96/25564 A1 | 8/1996 |
| WO | WO-03/078875 A1 | 9/2003 |
| WO | WO-2005/080057 A1 | 9/2005 |
| WO | WO-2007/139605 A1 | 12/2007 |
| WO | WO-2008/024005 | 2/2008 |
| WO | WO-2008/094246 A1 | 8/2008 |
| WO | WO-2008/094250 A1 | 8/2008 |
| WO | WO-2008/094251 A1 | 8/2008 |
| WO | WO-2009/126887 A1 | 10/2009 |
| WO | WO-2010/151833 A2 | 12/2010 |
| WO | WO-2010/151838 A2 | 12/2010 |
| WO | WO-2011/054056 A1 | 5/2011 |
| WO | WO-2013/119844 | 8/2013 |
| WO | WO-2013/167210 A1 | 11/2013 |
| WO | WO-2013/167211 A1 | 11/2013 |
| WO | WO-2014/186679 A1 | 11/2014 |
| ZA | 7301820 | 12/1973 |

OTHER PUBLICATIONS

Communication pursuant to Article 94(3) EPC on EP 18173473.2 DTD Nov. 14, 2019.
Examination Report on IN 201814019129 dated May 27, 2020.
Extended European Search Report in EP Application No. 18173473.2-1002 dated Oct. 5, 2018.
Extended European Search Report on EP 07 75 2456 dated Nov. 21, 2012.
Extended European Search Report on EP 07752456.9-2422 dated Nov. 28, 2012.
First Office Action for Chinese Patent App. No. 201710277300.8 dated Aug. 22, 2018, 23 pages (with translation).
Haddadi, Hamed; Henderson, Tristan; Crowcroft, JonThe ambient loo—Caught short when nature calls? April 2010Computer Communication Review, v 40, n 2, p. 78, Apr. 2010; ISSN: 01464833, E-ISSN: 19435819; DOI: 10.1145/1764873.1764887; Publisher: Association for Computing Machinery http://dl.acm.org/citation.cfm?doid=1764873.1764887.
Handbook of Structural Design of Machine Parts, Handbook of Coatings, pp. 248-257, Guangxi Science and Technology Press, May 2002, 1st Edition.
International Preliminary Report on Patentability dated Jul. 22, 2021 7 pages.
International Search Report Dated Apr. 2, 2020; 6 pages.
Second Office Action for Chinese Patent App. No. 201710277300.8 dated May 13, 2019, 20 pages (with translation).

\* cited by examiner

COMPOSITE FAUCET BODY AND INTERNAL WATERWAY

CROSS-REFERENCE TO RELATED APPLICATIONS

The present application is a Continuation of U.S. patent application Ser. No. 17/872,873, filed Jul. 25, 2022 (now U.S. Pat. No. 11,982,073), which is a Continuation of U.S. patent application Ser. No. 16/905,677, filed Jun. 18, 2020 (now U.S. Pat. No. 11,408,158), which is a Continuation of U.S. patent application Ser. No. 15/495,154, filed Apr. 24, 2017 (now U.S. Pat. No. 10,711,442), which claims the benefit of and priority to U.S. Provisional Patent Application No. 62/327,536, filed Apr. 26, 2016. The entire disclosures of U.S. patent application Ser. Nos. 17/872,873, 16/905,677, and 15/495,154 and U.S. Provisional Patent Application No. 62/327,536 are incorporated by reference herein.

BACKGROUND

The present disclosure relates generally to faucet assemblies. In particular, this disclosure relates to the construction of a faucet body and an internal waterway.

Faucet assemblies may include a faucet body, handles, valve cartridges, and a plumbing network. Faucet bodies may be configured to be coupled to the handles, valve cartridges, and plumbing network of the faucet assembly. Faucet bodies may be manufactured by forming the faucet body around a core (i.e., in a cast or mold). Faucet bodies are conventionally constructed from a metallic material such as brass or zinc. The core may maintain an empty space within the faucet body for mixing or ingress channels. When the core is removed from the faucet body, in a post-processing step, the body may require machining, polishing, and/or buffing of the surface. After the core is removed, internal components may be installed inside the faucet body. After installing the internal components in the faucet body, the faucet assembly may then be installed in an application.

SUMMARY

One embodiment of the present disclosure relates to faucet. The faucet includes a continuous internal waterway and a body. The continuous internal waterway includes a first chamber, a second chamber, a valve seat, and a waterway. The second chamber is configured to receive water from a water source. The valve seat is coupled to the first chamber and the second chamber. The valve seat is in fluid communication with the second chamber. The waterway is in fluid communication with the valve seat. The body encapsulates the continuous internal waterway. The faucet is operational to receive the water from the water source and to provide the water to the waterway. The body is isolated from the water by the continuous internal waterway during operation of the faucet.

Another embodiment of the present disclosure relates to a method for constructing a water faucet. The method includes coupling a valve seat to a bottom chamber and to a waterway. The valve seat, bottom chamber, and waterway form a continuous internal waterway. The method also includes placing the continuous internal waterway in a mold. The method also includes forming a body around the continuous internal waterway by surrounding the continuous internal waterway with encapsulating material in the mold. The method also includes removing the body from the mold. The continuous internal waterway is configured to receive water through the bottom chamber. The continuous internal waterway is also configured to provide water through the valve seat to the waterway. The continuous internal waterway is also configured to provide water from the waterway. The continuous internal waterway is continuous within the body Yet another embodiment of the present disclosure relates to a process for manufacturing a faucet. The process includes coupling a valve seat to an adjustable valve system, a waterway, and a bottom chamber such that the valve seat, the adjustable valve system, the waterway, and the bottom chamber are in fluid communication, thereby forming a continuous internal waterway. The process also includes covering the adjustable valve system with a print area cover. The print area cover is removably coupled to the valve seat. The print area cover is configured to cooperate with the valve seat to cover the adjustable valve system. The process also includes encapsulating the continuous internal waterway in a mold with a non-metallic encapsulating material, thereby forming a body around the continuous internal waterway. The process also includes removing the body from the mold. The print area cover prevents the non-metallic encapsulating material from contacting the adjustable valve system. The continuous internal waterway is configured to receive water through the bottom chamber. The continuous internal waterway is also configured to provide water through the valve seat to the waterway. The continuous internal waterway is also configured to provide water from the waterway.

It is to be understood that both the foregoing general description and the following detailed description are exemplary and explanatory only, and are not restrictive of the invention as claimed.

The invention is capable of other embodiments and of being carried out in various ways. Alternative exemplary embodiments relate to other features and combinations of features.

DETAILED DESCRIPTION

Before turning to the figures, which illustrate the exemplary embodiments in detail, it should be understood that the present disclosure is not limited to the details or methodology set forth in the description or illustrated in the figures.

It should also be understood that the terminology is for the purpose of description only and should not be regarded as limiting.

Referring to the Figures generally, various embodiments disclosed herein relate to a faucet constructed from plastic or composite material and having a fully assembled and complete internal waterway. The complete internal waterway may be assembled separate from the faucet. The complete internal waterway may be fully functional prior to being installed in the faucet. Print area covers may be attached on the complete internal waterway at various openings. The continuous internal waterway may be positioned in a mold. The print area covers may mount the continuous internal waterway to the mold. The mold may be configured in any desirable shape, thereby allowing the shape of the faucet to be tailored for a target application. The shape of the faucet may not be constrained by the continuous internal waterway. In some embodiments, the mold is configured to impart desired surface characteristics (e.g., roughness, design, texture, etc.) on the faucet.

The continuous internal waterway may be partially or completely encased in an encapsulating material in the mold. The continuous internal waterway may be defined by a maximum temperature. The maximum temperature may be a temperature at which components of the continuous internal waterway are undesirably affected. The encapsulating material may be a plastic or composite material. The encapsulating material may be defined by a processing temperature. The processing temperature may be a temperature at which the encapsulating material may be poured into the mold and around the continuous internal waterway. The processing temperature may be lower than the maximum temperature. In some embodiments, the processing temperature is lower than the maximum temperature by a factor of safety. Once removed from the mold, print area covers may be removed. No assembly of internal faucet components may be required once the faucet is removed from the mold.

Figure 1:
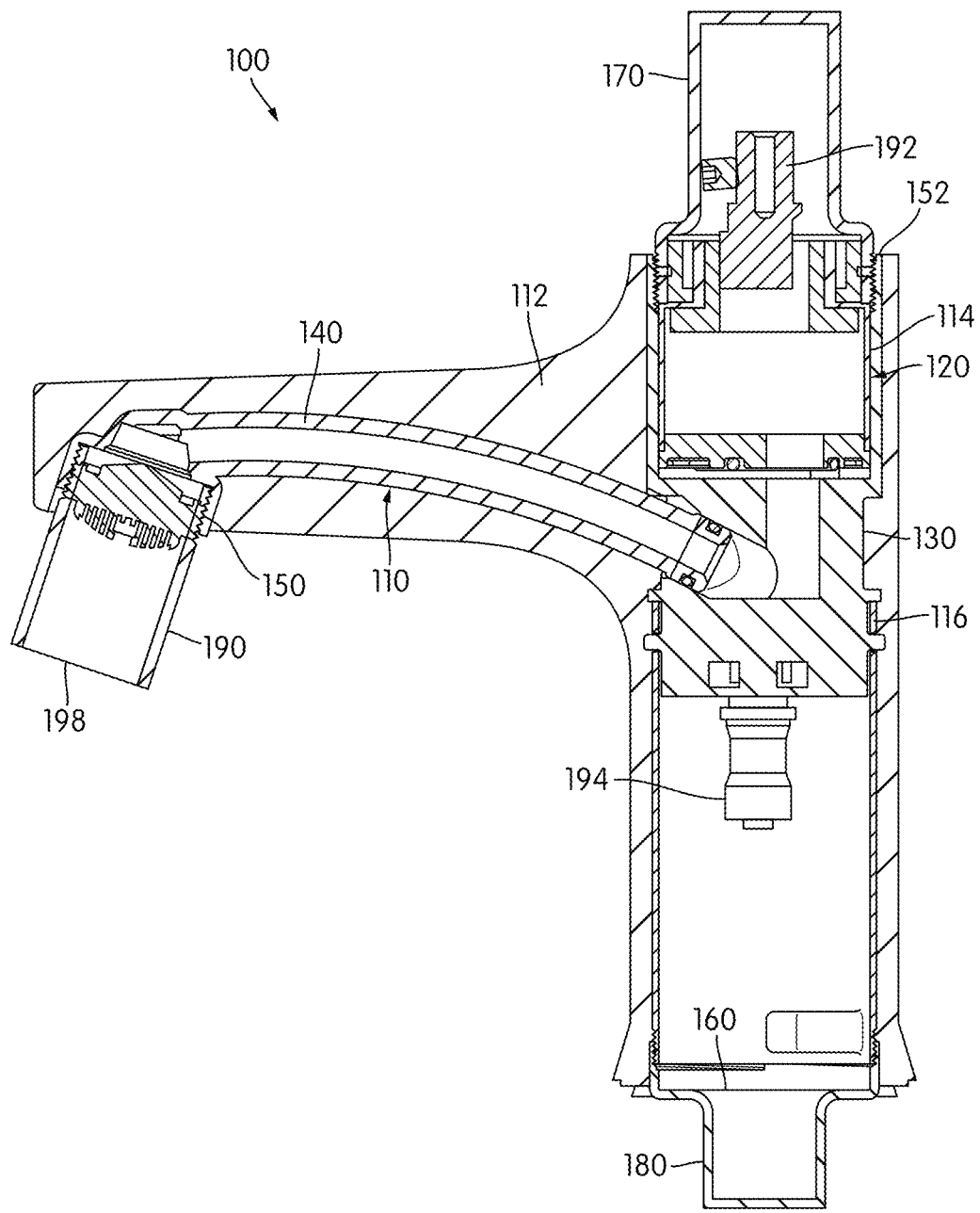
FIG. 1 is a cross-section view of a faucet preassembly including a continuous internal waterway, according to an exemplary embodiment of the present disclosure.

Referring to FIG. 1, a faucet preassembly, shown as faucet preassembly 100, includes internal plumbing, shown as continuous internal waterway 110, that is encased (e.g., encapsulated, contained, etc.) in a body, shown as body 112, that is formed from encapsulating material (e.g., permanent material, molding material, etc.). According to an exemplary embodiment, continuous internal waterway 110 includes a first chamber (e.g., section, portion, etc.), shown as upper chamber 114, and a second chamber (e.g., section, portion, etc.), shown as bottom chamber 116. Upper chamber 114 may be continuous with bottom chamber 116. In various embodiments, continuous internal waterway 110 includes a valve system, shown as adjustable valve system 120, a valve housing (e.g., puck, etc.), shown as valve seat 130, a waterway (e.g., conduit, connector, etc.), shown as waterway 140, and an aerator, shown as aerator 150. As shown in FIG. 1, adjustable valve system 120 is positioned within upper chamber 114. Valve seat 130 functions to fluidly couple upper chamber 114 to bottom chamber 116. In some embodiments, valve seat 130 fluidly and structurally couplers upper chamber 114 to bottom chamber 116. In an exemplary embodiment, upper chamber 114 is integrated within valve seat 130. In another embodiment, bottom chamber 116 is integrated within valve seat 130. In yet another embodiment, both upper chamber 114 and bottom chamber 116 are integrated within valve seat 130. Upper chamber 114 defines an opening (e.g., aperture, hole, etc.), shown as top opening 152, and bottom chamber 116 defines an opening (e.g., aperture, hole, etc.), shown as bottom opening 160. Top opening 152 and bottom opening 160 facilitate access into continuous internal waterway 110 from outside of continuous internal waterway 110.

According to an exemplary embodiment, continuous internal waterway 110 includes a first cover (e.g., cap, lid, support, etc.), shown as top opening print area cover 170, that is positioned over top opening 152, a second cover (e.g., cap, lid, support, etc.), shown as bottom opening print area cover 180 that is positioned over bottom opening 160, and a third cover, shown as aerator print area cover 190, that is positioned over aerator 150. In some embodiments, continuous internal waterway 110 does not include top opening print area cover 170, bottom opening print area cover 180, or aerator print area cover 190. Adjustable valve system 120 is shown in FIG. 1 to include a stem, shown as valve stem 192. Valve seat 130 may include a number of plumbing connections, shown as plumbing connections 194. As shown in FIG. 1, continuous internal waterway 110 is completely encased within body 112. In other embodiments, continuous internal waterway 110 is only partially encased within body 112.

In some applications, each of top opening print area cover 170, bottom opening print area cover 180, and aerator print area cover 190 may include an opening. As shown in FIG. 1, aerator print area cover 190 includes an opening, shown as opening 198. In alternative examples, aerator print area cover 190 does not include opening 198. Aerator print area cover 190 may facilitate mounting of continuous internal waterway 110 within a mold. For example, aerator print area cover 190 may attach to a mounting point within the mold. Further, aerator print area cover 190 may substantially prevent encapsulating material from entering continuous internal waterway 110.

Figure 2:
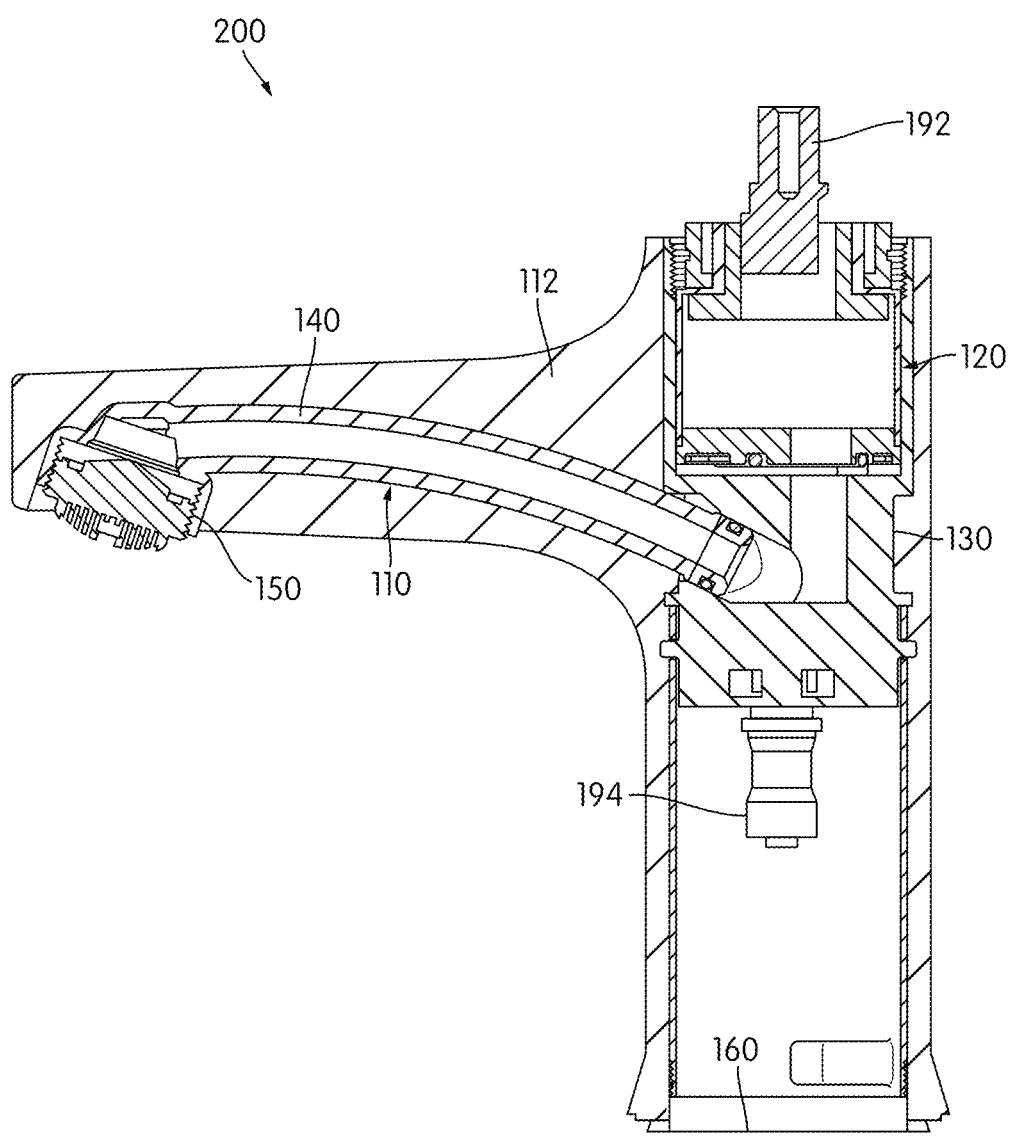
FIG. 2 is a cross-section view of a faucet, according to an exemplary embodiment of the present disclosure.

Referring to FIG. 2, a faucet, shown as faucet 200, includes all the components of faucet preassembly 100 except for top opening print area cover 170, bottom opening print area cover 180, and aerator print area cover 190. According to an exemplary embodiment, construction of faucet 200 occurs in an assembly stage, a pre-forming stage, a forming stage, and a post-forming stage. In the assembly stage, continuous internal waterway 110 is assembled. For example, continuous internal waterway 110 may be assembled by a worker (e.g., laborer, assembly person, etc.), a robotic device, an automated assembly line, or a combination thereof. Once assembled, continuous internal waterway 110 may provide all necessary connections for operations of faucet 200 (e.g., mixing of water streams, dispersal of mixed water streams, etc.). In one embodiment, continuous internal waterway 110 can operate as a fully functional faucet once connected to an operational plumbing network (e.g., a water supply) and a valve handle assembly. In various embodiments, continuous internal waterway 110 is assembled and then coupled to top opening print area cover 170, bottom opening print area cover 180, and aerator print area cover 190.

In the pre-forming stage, a forming process is selected and prepared, continuous internal waterway 110 is prepared for the forming process, and the encapsulating material of body 112 is selected. Body 112 may be defined by a processing temperature at which the encapsulating material may be formed around a mold. Body 112 may be chosen such that a desired configuration of continuous internal waterway 110 is suitable for the processing temperature of body 112. Continuous internal waterway 110 may be defined by a maximum temperature at which components of continuous internal waterway 110 may become undesirably affected. The processing temperature of the encapsulating material of body 112 may be lower than the maximum temperature of continuous internal waterway 110. According to various embodiments, the encapsulating material of body 112 is chosen such that the processing temperature of the encapsulating material of body 112 is lower than the maximum temperature of continuous internal waterway 110. The difference between the maximum temperature and the processing temperature may be expressed by a factor of safety calculated by, for example, computing the ratio of the maximum temperature to the processing temperature. In some embodiments, the continuous internal waterway 110 has a factor of safety of 1.3, 1.4, 1.6, and other similar values. In some embodiments, the maximum temperature of continuous internal waterway 110 is one-hundred and fifty degrees Celsius.

Conventional faucets may be assembled by first casting a faucet body from a molten metal. A processing temperature of a conventional faucet body may be greater than four-hundred degrees Celsius. Because conventional faucets are cast from molten metal, only certain features may be incorporated into the faucet through the casting process such as ingress or mixing channels. In the assembly of a conventional faucet, internal faucet components are assembled within the faucet after the metal body has cooled. Faucet 200 may be constructed without the need to assemble components within faucet 200 after faucet 200 is removed from a mold.

Conventional faucets may be cast from corrosion resistant metals, such as brass, which may require machining, polishing, and buffing. Further, flaws in conventional faucets may not be discovered until later steps in a manufacturing process. In other examples, conventional faucets may be cast from corrosion susceptible metals, such as zinc, and therefore may not be suitable for direct contact with water. Accordingly, additional components (e.g., ingress and mixing channels, etc.) may need to be assembled in the conventional faucet after casting requiring additional assembly time. Accordingly, conventional faucets may be undesirably expensive. Faucet 200 may be formed with body 112 being constructed from low-cost encapsulating material such as plastics or composites. The body 112 may be constructed from corrosion resistant encapsulating material and may not require machining, polishing, or buffing. For example, body 112 may be constructed from encapsulating material that does not contain any metal and may not corrode.

Top opening print area cover 170, bottom opening print area cover 180, and aerator print area cover 190 may be coupled to a mold in various locations such that a desired configuration of faucet 200 may be achieved. Top opening print area cover 170, bottom opening print area cover 180, and aerator print area cover 190 may have various wall thicknesses and be constructed of various materials depending on the desired forming process of faucet 200. For example, the processing temperature of encapsulating material 196 and/or the maximum temperature of continuous internal waterway 110 may influence the wall thickness of the top opening print area cover 170, bottom opening print area cover 180, and aerator print area cover 190. In other embodiments, a combination of the wall thickness and the material of the top opening print area cover 170, bottom opening print area cover 180, and aerator print area cover 190 is altered depending on the processing temperature of encapsulating material 196 and/or the maximum temperature of continuous internal waterway 110.

Top opening print area cover 170, bottom opening print area cover 180, and aerator print area cover 190 may be formed from a separate process as those mentioned for faucet 200. Additionally, top opening print area cover 170, bottom opening print area cover 180, and aerator print area cover 190 may be formed from different processes or of different materials than the encapsulating material of body 112. Top opening print area cover 170, bottom opening print area cover 180, and aerator print area cover 190 may couple to continuous internal waterway 110 through the use of a variety of different mechanisms such as interlocking of threaded interfaces, adhesives, ultrasonic welding, friction fits, or other suitable mechanisms such that faucet 200 may be tailored for a target application.

In one embodiment, top opening print area cover 170, bottom opening print area cover 180, and aerator print area cover 190 each individually contain a threaded pattern that is configured to threadably mate with a matching threaded pattern on continuous internal waterway 110. In another embodiment, top opening print area cover 170, bottom opening print area cover 180, and aerator print area cover 190 individually contain tabs (e.g., protrusions, protuberances, tangs, teeth, etc.) configured to fit within slots (e.g., recesses, receivers, channels, etc.) within continuous internal waterway 110. In yet another embodiment, top opening print area cover 170, bottom opening print area cover 180, and aerator print area cover 190 are individually affixed within continuous internal waterway 110 through the use of a permanent or temporary adhesive (e.g., glue, epoxy, cement, rubber cement, vinyl cement, etc.). In yet another embodiment, top opening print area cover 170, bottom opening print area cover 180, and aerator print area cover 190 are individually affixed within continuous internal waterway 110 through the use of ultrasonic welds from an ultrasonic welding process. In other embodiments, top opening print area cover 170, bottom opening print area cover 180, and aerator print area cover 190 are individually affixed within continuous internal waterway 110 through the use of hot gas welding, heat sealing, speed tip welding, extrusion welding, contact welding, hot plate welding, high frequency welding, induction welding, injection welding, friction welding, spin welding, laser welding, or solvent welding.

The top opening print area cover 170, bottom opening print area cover 180, and aerator print area cover 190 may be configured to cover (e.g., protect, shield, etc.) certain regions of continuous internal waterway 110 from body 112. Certain regions of continuous internal waterway 110, such as aerator 150, valve stem 192, adjustable valve system 120, and bottom opening 160, may not be intended for contact with body 112.

In the forming stage, continuous internal waterway 110 is aligned in a mold and body 112 is formed around continuous internal waterway 110 resulting in faucet preassembly 100. In some embodiments, body 112 solidifies (e.g., cures, sets, etc.) after a certain period of time. In various examples, body 112 may solidify as a result of chemical crosslinking, cooling, evaporation of carrying solvents, or other solidification processes. In one application, body 112 is constructed from an encapsulating material that is a composite material with a permanent cross-link network. The permanent cross-link network may prevent problems normally associated with composite molding such as stress cracking, physical aging, and creep. In some applications, certain portions of the mold containing continuous internal waterway 110 may be locally heated or cooled. In other applications, the entire mold containing continuous internal waterway 110 may be heated or cooled.

In various embodiments, faucet 200 is formed via a molding process which utilizes a mold (e.g., core, blank, etc.). In one embodiment, faucet 200 is formed via an injection molding process. In other embodiments, faucet 200 is formed via a casting process which utilizes a mold (e.g., core, blank, etc.). According to various embodiments, faucet 200 is formed via sand casting, permanent mold casting, investment casting, lost foam casting, die casting, centrifugal casting, glass casting, or slip casting. According to other embodiments, faucet 200 is formed via blow molding, powder metallurgy and sintering, compression molding, extrusion molding, laminating, reaction injection molding, die casting, thin-wall injection molding, matrix molding, rotational molding (e.g., rotomolding, etc.), spin casting, transfer molding, thermoforming, or vacuum forming. According to various embodiments, faucet 200 is formed through the use of a silicon mold. In some embodiments, faucet 200 is formed through an injection molding process defined by an injection pressure. In one example, the injection pressure may be between thirty-four kilopascals and one-hundred and four kilopascals.

According to various exemplary embodiments, continuous internal waterway 110 serves as the core of a mold. In these embodiments, body 112 is formed around continuous internal waterway 110 within the mold. Depending on the configuration of the mold, various sections of faucet 200 may have a different wall thickness (e.g., a thickness of body 112 between an outside surface of faucet 200 and continuous internal waterway 110). For example, the thickness of body 112 that surrounds waterway 140 may be greater than the thickness of body 112 that surrounds adjustable valve system 120. The mold may allow faucet 200 to obtain any desired shape or configuration. For example, the mold may allow a spout of faucet 200 to have a target shape such as a prism, cylinder, rectangle, or other shape such that faucet 200 may be tailored for a target application. Faucet 200 may have a shape that is not constrained by continuous internal waterway 110. In some embodiments, faucet 200 has an unconventional or application tailored shape. Further, different shapes of faucet 200 may be utilized with the same continuous internal waterway 110. In contrast, a conventional faucet may have a shape that is constrained by internal components and the ability to install the internal components within the conventional faucet. Similarly, the mold may allow faucet 200 to have any desired surface characteristics such as texture and design. For example, the mold may be polished allowing faucet 200 to have a polished surface when removed from the mold thus eliminating the need for additional polishing or buffing.

Rather than simply using a core to maintain open space, as is done in a conventional faucet, continuous internal waterway 110 serves as the core of the mold for faucet 200, providing significant cost savings compared to the conventional faucet. By utilizing continuous internal waterway 110 as the core of the mold, many costs associated with metal casting of conventional faucet bodies such as sand cores, casting voids, and pitting, are eliminated. Additionally, continuous internal waterway 110 will provide significant cost savings compared to a conventional faucet because assembly is performed outside of faucet 200, rather than inside of a faucet body as is done in a conventional faucet.

In mold design, the core is maintained in a target position within the mold. The core may be geometrically constrained within the mold. The core may be held in the mold by a series of mounting points. Mounting points may be located at locations where the mold supports the core, or points where the core mounts to the mold. For example, the mold may include a number of posts configured to be received within the core, thereby supporting the core. In another example, the core may contain a number of posts configured to be received within the mold, thereby supporting the core within the mold. Depending on the mold configuration (e.g., set up, lay out, etc.), different mounting points of continuous internal waterway 110 within the mold may be necessary. The mold may be oriented in any fashion, such as a vertical or horizontal fashion. Depending on the orientation of the mold, different mounting points may be necessary. In one embodiment, continuous internal waterway 110 is held within the mold through the use of top opening print area cover 170, bottom opening print area cover 180, and/or aerator print area cover 190. In this embodiment, top opening print area cover 170, bottom opening print area cover 180, and/or aerator print area cover 190 may be received within the mold. For example, the mold may have three individual openings each sized to receive one of the top opening print area cover 170, the bottom opening print area cover 180, and/or the aerator print area cover 190 whereby continuous internal waterway 110 may be suspended within the mold such that encapsulating material may be exposed to all sides of continuous internal waterway 110. In other examples, a different core support structure may be utilized such as various posts, spacers, or braces to support continuous internal waterway 110 within the mold.

In the forming stage, body 112 may be formed from encapsulating material that is injected (e.g., poured, etc.) into the mold thereby surrounding continuous internal waterway 110 within the mold. According to an exemplary embodiment, body 112 is formed from a non-metallic encapsulating material. In some embodiments, body 112 is constructed from an encapsulating material that is a composite (e.g., particulate filled thermoset, thermoplastic polymer resin, etc.) or a plastic. For example, body 112 may be constructed from an encapsulating material that is made up of two or more disparate constituent materials. In other examples, body 112 may be constructed from other encapsulating materials such as inorganic ceramics, geopolymer cements, fiber wound composites, metallic alloys, fiber embedded composites, acrylic, acrylonitrile butadiene styrene (ABS), nylon, polycarbonate, polypropylene, polystyrene, Teflon®, thermoplastic, thermoset, thermosetting polymer, resin, epoxy, or other suitable materials such that faucet 200 may be tailored for a target application. According to various embodiments, body 112 is defined by a density. Accordingly, the encapsulating material of body 112 may be selected for a particular application based on a desired density for a particular application. In some applications, it may be desirable to select a particular encapsulating material for body 112 having an elevated density because added weight may signify added value to a consumer.

Once formed, faucet 200 may be removed from the mold. In the post-forming stage, faucet preassembly 100 is removed from the mold, and top opening print area cover 170, bottom opening print area cover 180, and aerator print area cover 190 are removed, resulting in faucet 200. Further, in the post-forming process faucet 200 may be cleaned and inspected, and other post-forming components (e.g., handles, knobs, etc.) may be coupled to faucet 200. Faucet 200 may then be installed in a target application (e.g., sink, vanity, countertop, etc.).

In the post-forming stage, top opening print area cover 170, bottom opening print area cover 180, and aerator print area cover 190 may be removed from faucet pre-assembly 100. Any of top opening print area cover 170, bottom opening print area cover 180, and aerator print area cover 190 may be removed from faucet preassembly 100 using a material removal process such as machining (e.g., automated, manual). Faucet 200 is formed once top opening print area cover 170, bottom opening print area cover 180, and aerator print area cover 190 have been removed from faucet preassembly 100. According to various embodiments, faucet 200 does not require machining, polishing, or buffing of any surface once removed from the mold. Accordingly, assembly time of faucet 200 may be significantly lower than assembly time of a conventional faucet. In other examples, faucet 200 may be subjected to a hexavalent chrome free metallizing technology such as embedded physical vapor deposition. After being formed, faucet 200 may be inspected and cleaned. Handles, plumbing networks, and other components may then be installed on faucet 200. Alternatively, faucet 200 may then be installed in a plumbing fixture such as a vanity or countertop.

In application, adjustable valve system 120 and aerator 150 may be serviced or interchanged. For example, a user may remove a handle of faucet 200 to access adjustable valve system 120. Following this example, the user may remove adjustable valve system 120 for servicing and, once serviced, may simply reinstall adjustable valve system 120 into faucet 200 and reinstall the handle on valve stem 192.

It is understood that additional stages or sub-stages may also be included in the construction of faucet 200 without departing from the scope of the present disclosure. Similarly, it is understood that the steps or sub-steps within the stages or sub-stages may be performed in any suitable combination or order without departing from the scope of the present disclosure.

According to an exemplary operation, water may enter faucet 200 via a plumbing network inserted through bottom opening 160 coupled to plumbing connection 194. In some embodiments, faucet 200 incorporates multiple plumbing connections 194. In one embodiment, faucet 200 incorporates one plumbing connection 194 for hot water and one plumbing connection 194 for cold water. After entering through plumbing connection 194, water may enter valve seat 130. According to various embodiments, after leaving valve seat 130, water enters adjustable valve system 120. Adjustable valve system 120 may be controlled via valve stem 192. Valve stem 192 may be coupled to a handle such that valve stem 192 may be interacted with by a user. Valve stem 192 may be configured to adjust flow rate and/or temperature of water from faucet 200.

In various embodiments, adjustable valve system 120 controls the ratio of hot water to cold water and controls the flow rate of the combined water stream. In other embodiments, faucet 200 includes two adjustable valve systems 120. According to these embodiments, faucet 200 has one adjustable valve system 120 dedicated to control temperature of water from faucet 200 and the other adjustable valve system 120 dedicated to control flow rate of water from faucet 200. In some embodiments, adjustable valve system 120 includes more than one valve stem 192. According to an embodiment where hot and cold water are independently introduced to valve seat 130 and adjustable valve system 120 through the use of two pluming connections 194, the two independent water streams are mixed in adjustable valve system 120 and are redirected into valve seat 130 as a single mixed water stream. Next, water from adjustable valve system 120 may be redirected to valve seat 130. From valve seat 130, water may traverse waterway 140 and enter aerator 150. Aerator 150 may be a standard aerator or may be a functional aerator. For example, aerator 150 may have multiple settings (e.g., modes) allowing for various water dispersion patterns (e.g., spray, mist, pulsating, etc.). After exiting aerator 150, the mixed water may be accessible to a user.

Figure 3:
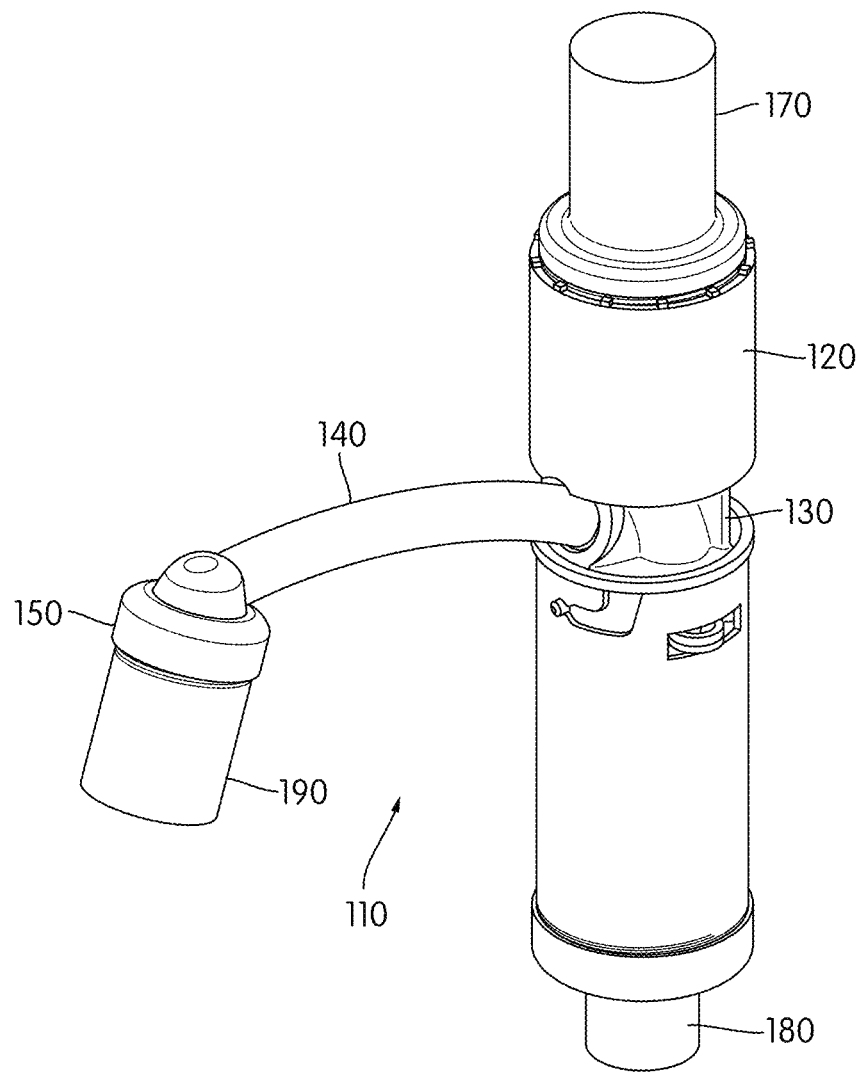
FIG. 3 is a perspective view of a continuous internal waterway for a faucet, according to an exemplary embodiment of the present disclosure.
Figure 4:
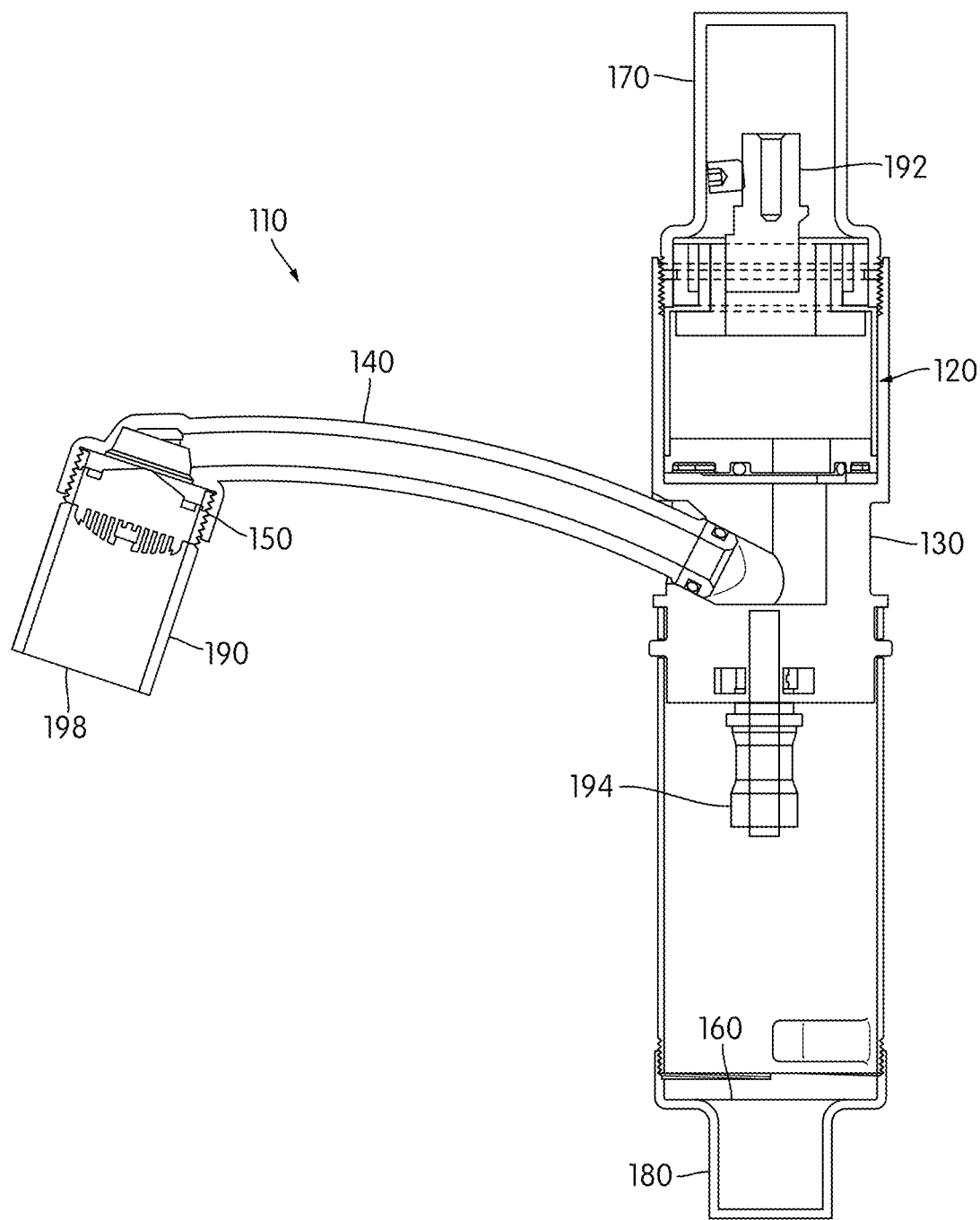
FIG. 4 is a cross-section view of the continuous internal waterway shown in FIG. 3.
Figure 5:
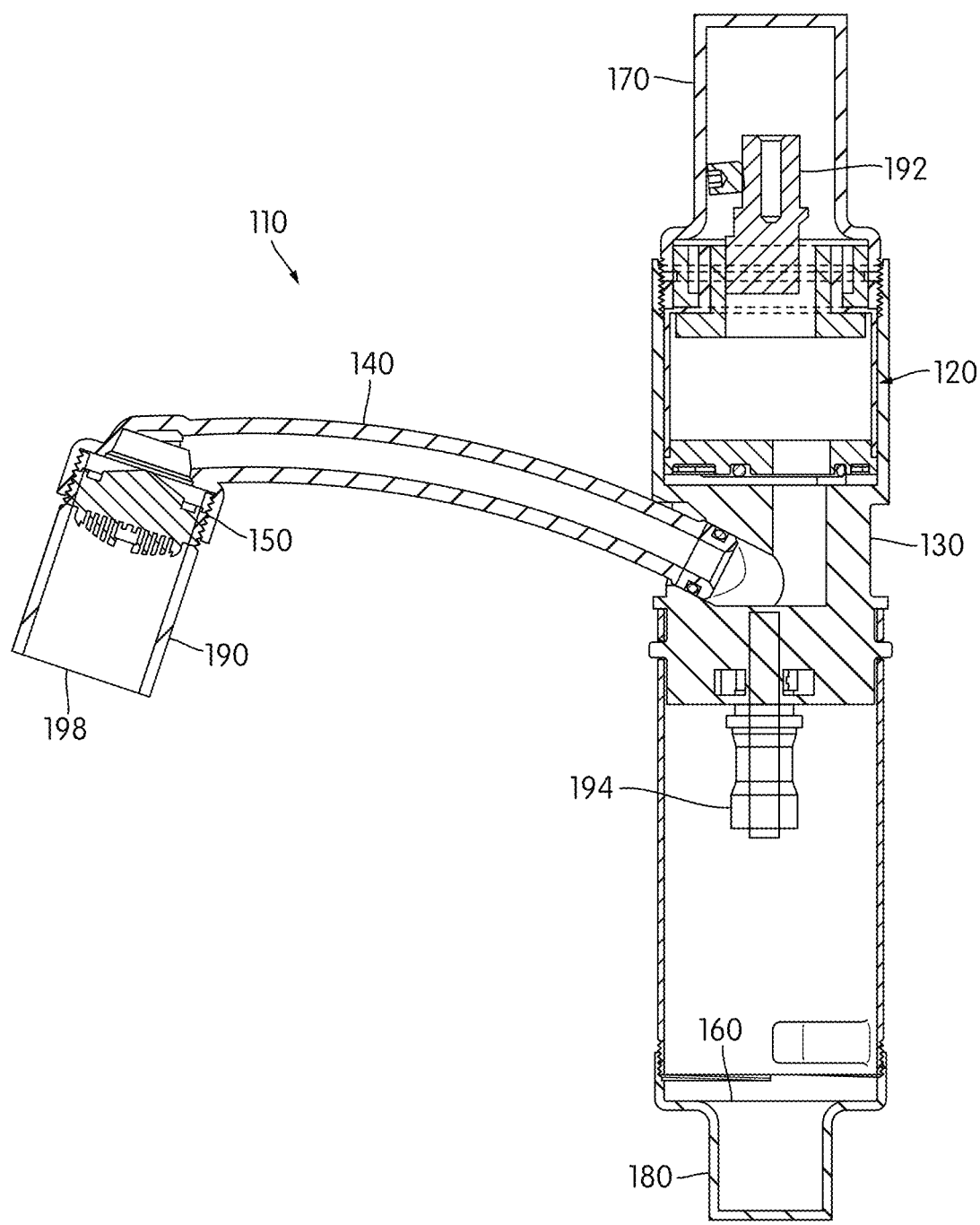
FIG. 5 is another cross-section view of the continuous internal waterway shown in FIG. 3.
Figure 6:
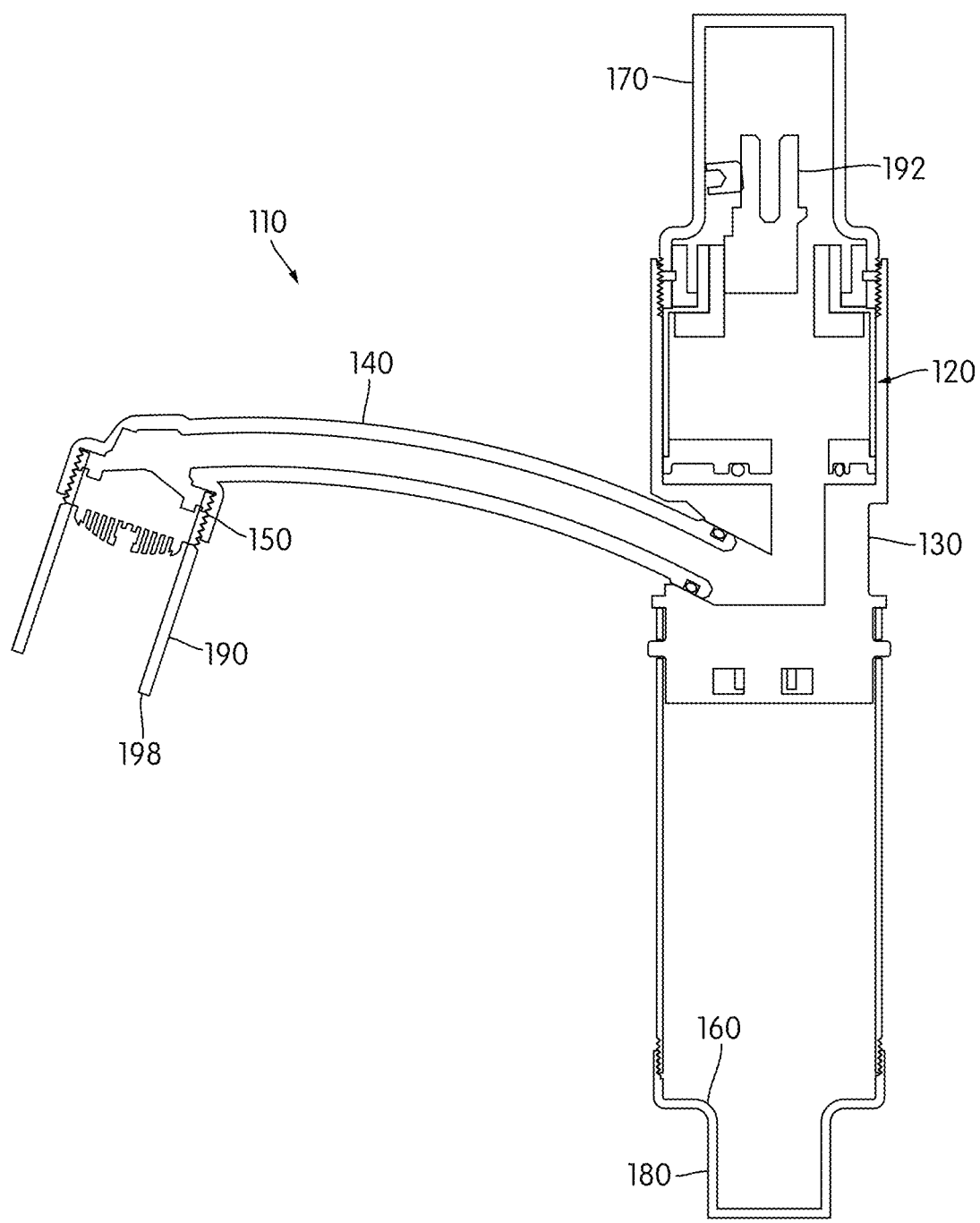
FIG. 6 is yet another cross-section view of the continuous internal waterway shown in FIG. 3.

Referring to FIGS. 3-6, various views of continuous internal waterway 110 are shown. Continuous internal waterway 110 may incorporate features for mounting in a mold. As shown in FIG. 3, adjustable valve system 120, waterway 140, and aerator 150 have a rounded exterior surface. However, in some applications, any of adjustable valve system 120, waterway 140, and aerator 150 may have a textured or otherwise shaped (e.g., square, polygonal, hexagonal, etc.) surface.

While body 112 has been described for faucet 200, it is understood that body 112 could be utilized to encapsulate a variety of different structure, components, and devices. For example, body 112 may be utilized to encapsulate electronics, sensors, and lights. Accordingly, continuous internal waterway 110 may similarly incorporate additional components such as electronics, sensors, and lights. While body 112 has been described to form faucet 200, it is similarly understood that other faucets, fixtures, bath fixtures, water fixtures, lavatory fixtures, and plumbing fixtures may similarly be formed. For example, body 112 may be utilized to form a vanity integrated with a plumbing fixture (e.g., faucet 200). Similarly, body 112 may be utilized to form a lavatory fixture such as a toilet. In another example, body 112 may be utilized to form a tray faucet, or components thereof. In other examples, body 112 may be utilized to form handles that may be coupled to a plumbing fixture (e.g., faucet 200).

Figure 7:
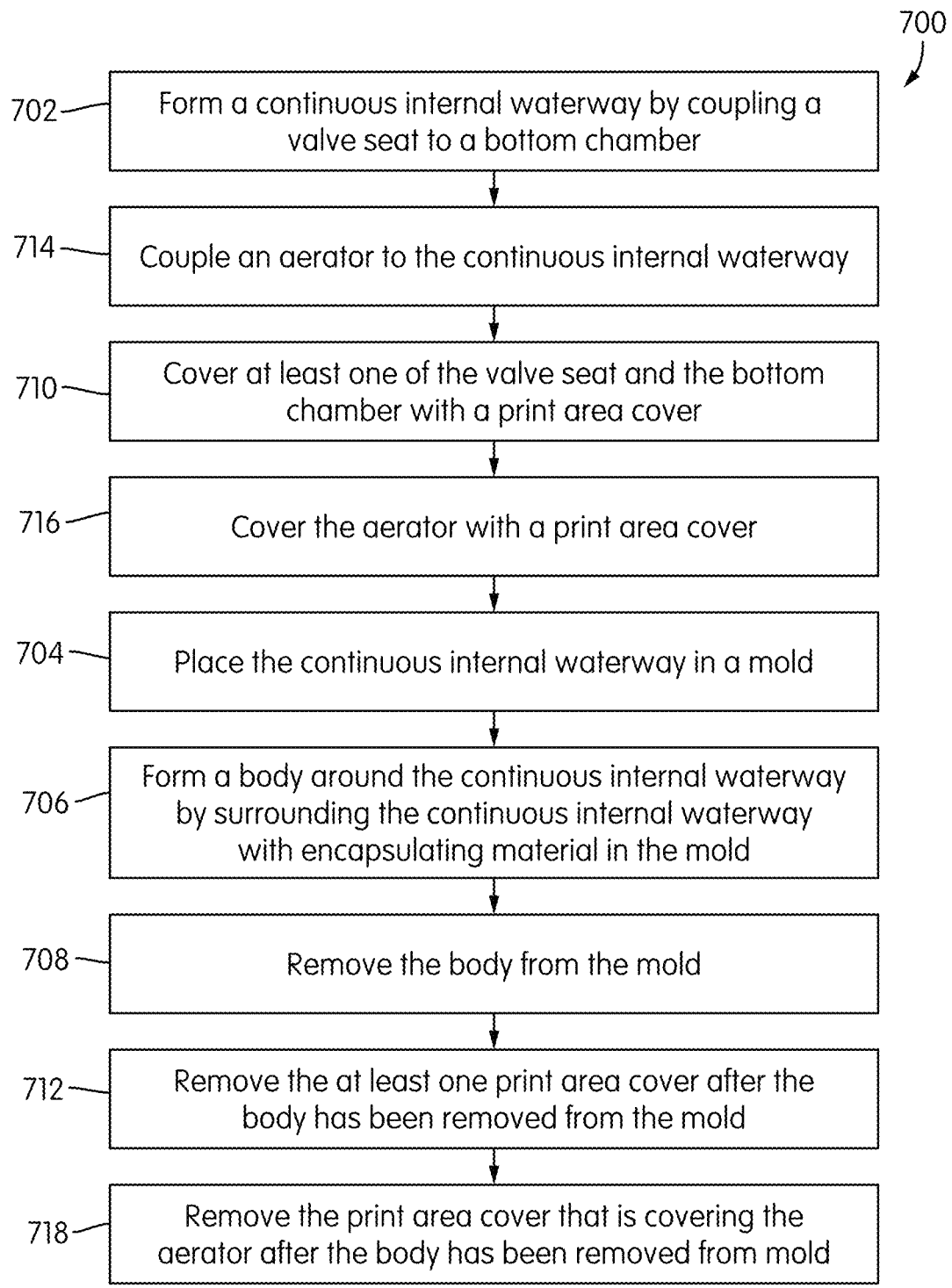
FIG. 7 is a flow chart illustrating a method for constructing a faucet, such as the faucet shown in FIG. 2, according to an exemplary embodiment of the present disclosure.

Referring to FIG. 7, a method 700 for constructing faucet 200 is shown according to an exemplary embodiment. Method 700 includes forming continuous internal waterway 110 by coupling valve seat 130 to bottom chamber 116 and to waterway 140 (step 702). Method 700 also includes placing continuous internal waterway 110 in a mold (step 704). Method 700 also includes forming body 112 around continuous internal waterway 110 by surrounding continuous internal waterway 110 with encapsulating material in the mold (step 706). Method 700 also includes removing body 112 from the mold (step 708). In some implementations of method 700, continuous internal waterway 110 is configured to receive water through bottom chamber 116. Continuous internal waterway 110 may also be configured to provide water through valve seat 130 to waterway 140. Continuous internal waterway 110 may also be configured to provide water from waterway 140. Further, body 112 does not form any portion of continuous internal waterway 110 in some implementations of method 700.

Method 700 may also include covering at least one of valve seat 130 and bottom chamber 116 with top opening print area cover 170 and/or bottom opening print area cover 180 (step 710) before placing continuous internal waterway 110 in the mold (step 704). In some implementations of method 700, top opening print area cover 170 and/or bottom opening print area cover 180 is configured to prevent the encapsulating material of body 112 from entering continuous internal waterway 110. Method 700 may also include removing top opening print area cover 170 and/or bottom opening print area cover 180 after body 112 has been removed from the mold (step 712). Method 700 may also include coupling aerator 150 to waterway 140, aerator 150 forming a portion of continuous internal waterway 110 (step 714). In some implementations of method 700, continuous internal waterway 110 is configured to provide the water through aerator 150. Aerator 150 is at least partially contained within body 112 in some implementations of method 700.

Method 700 may also include covering aerator 150 with aerator print area cover 190 (step 716). Method 700 may also include removing aerator print area cover 190 after body 112 has been removed from the mold (step 718). In some implementations, aerator print area cover 190 is configured to at least partially facilitate mounting of continuous internal waterway 110 within the mold. Aerator print area cover 190 may be configured to cooperate with the mold to prevent the encapsulating material of body 112 from entering continuous internal waterway 110. Continuous internal waterway 110 may be defined by a maximum temperature associated with a temperature at which a portion of continuous internal waterway 110 becomes undesirably affected by the temperature. The encapsulating material of body 112 may be defined by a processing temperature associated with a temperature at which the encapsulating material can be introduced into the mold. The maximum temperature may be greater than the processing temperature. A ratio of the maximum temperature to the processing temperature may be equal to or greater than a factor of safety (e.g., 1.3, 1.4, 1.5, 1.6, etc.). The encapsulating material of body 112 may be non-metallic.

Figure 8:
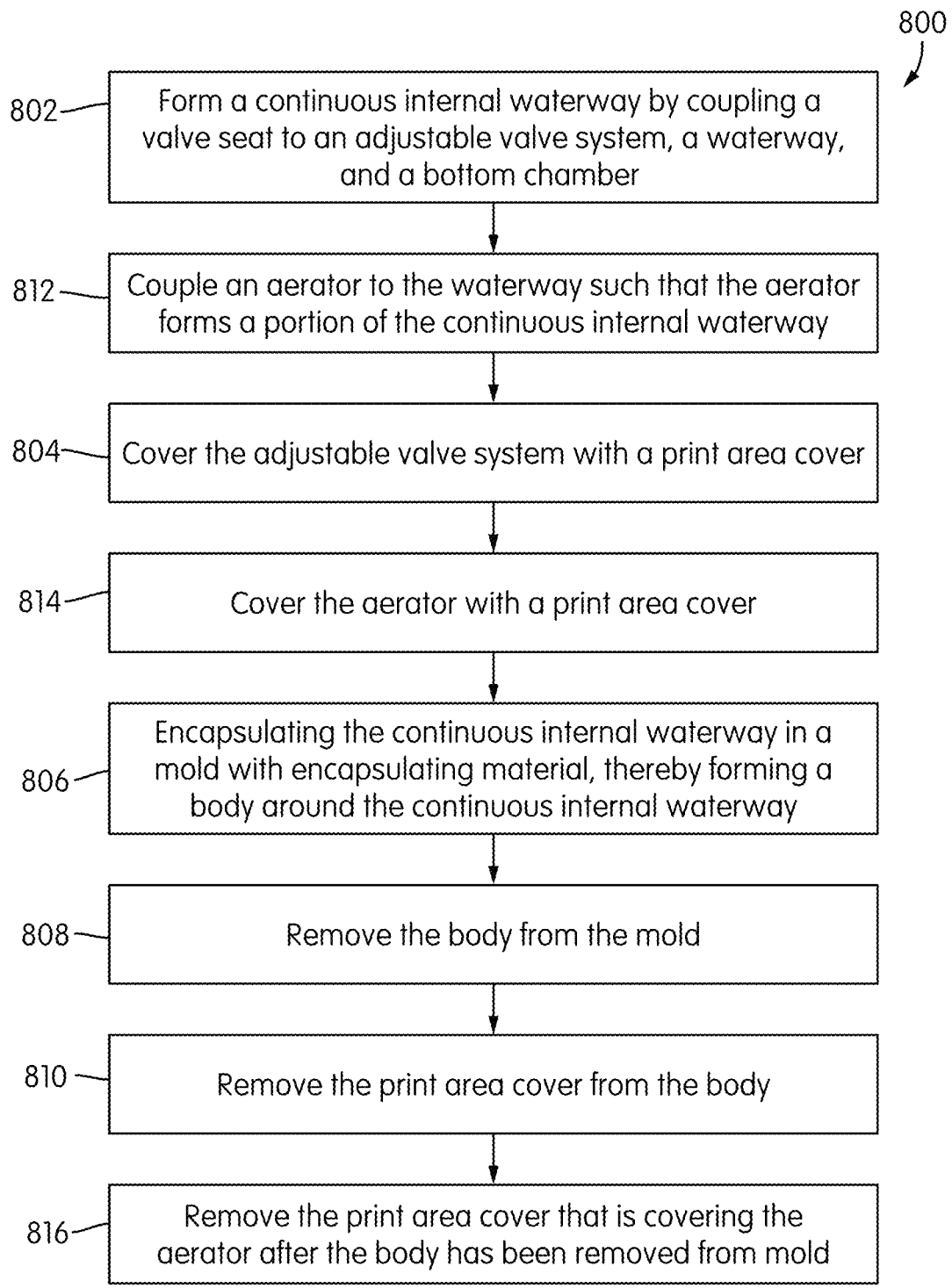
FIG. 8 is a flow chart illustrating a process for manufacturing a faucet, such as the faucet shown in FIG. 2, according to an exemplary embodiment of the present disclosure.

Referring to FIG. 8, a process 800 for constructing faucet 200 is shown according to an exemplary embodiment. Process 800 includes coupling valve seat 130 to adjustable valve system 120, waterway 140, and bottom chamber 116 such that valve seat 130, adjustable valve system 120, waterway 140, and bottom chamber 116 are in fluid communication, thereby forming continuous internal waterway 110 (step 802). Process 800 also includes covering adjustable valve system 120 with top opening print area cover 170 (step 804). Top opening print area cover 170 may be removably coupled to valve seat 130 and configured to cooperate with valve seat 130 to cover adjustable valve system 120. Process 800 also includes encapsulating continuous internal waterway 110 in a mold with an encapsulating material (e.g., a non-metallic encapsulating material, etc.), thereby forming body 112 around continuous internal waterway 110 (step 806). Process 800 also includes removing body 112 from the mold (step 808). In some implementations of process 800, top opening print area cover 170 prevents the encapsulating material from contacting adjustable valve system 120. Continuous internal waterway 110 may be configured to receive water through bottom chamber 116, to provide water through valve seat 130 to waterway 140, and to provide water from waterway 140.

Process 800 may also include removing top opening print area cover 170 after body 112 has been removed from the mold (step 810). Process 800 may also include coupling aerator 150 to waterway 140, aerator 150 forming a portion of continuous internal waterway 110 (step 812). Process 800 may also include covering aerator 150 with aerator print area cover 190 (step 814). Process 800 may also include removing aerator print area cover 190 after body 112 has been removed from the mold (step 816). Continuous internal waterway 110 may be configured to provide the water through aerator 150. Aerator print area cover 190 may be configured to at least partially facilitate mounting of continuous internal waterway 110 within the mold. In some implementations of process 800, top opening print area cover 170 is configured to cooperate with the mold to prevent the encapsulating material from entering continuous internal waterway 110. Continuous internal waterway 110 may be defined by a maximum temperature associated with a temperature at which a portion of continuous internal waterway 110 becomes undesirably affected by the temperature. Similarly, the encapsulating material of body 112 may be defined by a processing temperature associated with a temperature at which the encapsulating material of body 112 can be introduced into the mold. The maximum temperature may be greater than the processing temperature.

In some embodiments, continuous internal waterway 110 includes additional components, such as mounting hardware. For example, threaded posts may be incorporated into continuous internal waterway 110 such that faucet 200 includes the threaded posts. Similarly, other fasteners (e.g., bolts, screws, etc.) or fastener interfaces (e.g., threaded holes, etc.) may be incorporated into continuous internal waterway 110. In other examples, continuous internal waterway 110 may include handles.

A conventional faucet may experience leaks between various components throughout the useful life of the conventional faucet. These leaks may be undesirable and result in damage to the faucet and/or surrounding items such as counters, floors, and walls. Faucet 200 may not be subject to leaks at the same places as the conventional faucet due to the continuity of body 112.

While faucet 200 is shown to include only one plumbing connection 194, it is understood that faucet 200 may include multiple plumbing connections such that faucet 200 may be tailored for a target application. In various embodiments, faucet 200 and/or continuous internal waterway 110 include various suitable hardware components (e.g., crush washers, washers, bushings, spacers, O-rings, etc.). According to various embodiments, faucet 200 is utilized in various faucet assemblies such as mono-block lavatory faucets, bridge style kitchen faucets, bathfill faucets, or other suitable types of faucets such that the faucet assembly may be tailored for a target application. While faucet 200 has been referenced in regards to a supply of water, it is understood that other similar fluids could be utilized with faucet 200.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the present disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A faucet comprising:
    an internal waterway at least partially formed of a first material defined by a maximum temperature, the internal waterway comprising:
        a valve seat configured to receive water; and
        a conduit coupled to the valve seat and configured to receive the water from the valve seat; and
    a body formed of a second material having a processing temperature less than the maximum temperature of the first material forming the internal waterway, wherein the body is cast around the internal waterway.

2. The faucet of claim 1, wherein the internal way further comprises an adjustable valve system coupled to the valve seat independently of the conduit and in fluid communication with the valve seat independently of the conduit, wherein the body is isolated by the conduit from the water within the conduit when water is received in the conduit.

3. The faucet of claim 2, wherein the adjustable valve system comprises a valve stem configured to receive a user input to control the water within the valve seat when the valve seat is receiving the water.

4. The faucet of claim 3, further comprising a handle comprising a recess configured to receive the valve stem and couple the handle to the valve stem, the handle configured to receive the user input to control the water within the valve seat when the valve seat is receiving the water.

5. The faucet of claim 1, wherein the processing temperature is a temperature at which the second material flows into a mold to form around the internal waterway.

6. The faucet of claim 1, wherein the first material is in a solid state when the second material is cast.

7. The faucet of claim 1, wherein the internal waterway is positioned within a mold as a core of the mold, and wherein the second material is poured into the mold around the core.

8. The faucet of claim 1, wherein the second material is a composite material.

9. The faucet of claim 1, wherein the second material comprises at least one of a thermoplastic, a thermoset, a thermosetting polymer, a resin, or an epoxy.

10. The faucet of claim 1, wherein the second material comprises two or more disparate constituent materials.

11. The faucet of claim 10, wherein the two or more disparate constituent materials of the second material are reactive such that the unitary body transitions from a non-solid state to a solid state via a chemical reaction when casting the unitary body around the internal waterway.

12. A method for constructing a faucet, the method comprising:
    positioning a plumbing assembly at least partially formed of a first material, defined by a maximum temperature, in a mold, the plumbing assembly comprising a valve seat coupled to a conduit; and
    at least partially encapsulating the plumbing assembly in a second material by casting the second material around the plumbing assembly in the mold, the second material having a processing temperature less than the maximum temperature of the first material.

13. The method of claim 12, further comprising:
    coupling, prior to positioning the plumbing assembly in the mold, mounting hardware to the plumbing assembly; and
    casting the body at least partially around the plumbing assembly and at least partially around the mounting hardware.

14. The method of claim 12, wherein the processing temperature is a temperature at which the second material flows into the mold to form around the plumbing assembly.

15. The method of claim 12, wherein at the processing temperature the plumbing assembly is in a solid state and the second material is castable.

16. The method of claim 12, wherein the second material is a composite comprising two or more disparate constituent materials.

17. The method of claim 16, wherein the second material transitions from a non-solid state to a solid state via at least one of a chemical reaction or cooling when forming the body around the plumbing assembly.

18. The method of claim 12, further comprising:
    coupling, to the valve seat, an adjustable valve operable to control at least one of a flow rate or temperature of water dispensed from the faucet, wherein the adjustable valve comprises a valve stem configured to receive a user input to control the water within the valve seat when the valve seat is receiving water; and
    coupling, to the valve stem, a handle at least partially formed of the second material.

19. A faucet comprising:
    a plumbing assembly at least partially formed of a first material defined by a maximum temperature, the plumbing assembly comprising:
        a valve seat; and
        a body chamber coupled to the valve seat and in fluid communication with the valve seat; and
    a body formed of a composite material having a processing temperature less than the maximum temperature, wherein the body at least partially encapsulates the plumbing assembly and is isolated by the body chamber from water within the body chamber when the water is within the body chamber.

20. The faucet of claim 19, wherein:
    the plumbing assembly is in a solid state at the processing temperature;
    the body is in a non-solid state at the processing temperature; and
    the body comprises a composite material comprising of two or more disparate constituent materials.

* * * * *